United States Patent
Zeigler et al.

(10) Patent No.: US 10,175,938 B2
(45) Date of Patent: Jan. 8, 2019

(54) WEBSITE NAVIGATION VIA A VOICE USER INTERFACE

(71) Applicant: Microsoft Technology Licensing, LLC, Redmond, WA (US)

(72) Inventors: Andrew S. Zeigler, Seattle, WA (US); Michael Han-Young Kim, Redmond, WA (US); Rodger William Benson, Seattle, WA (US); Raman Kumar Sarin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 356 days.

(21) Appl. No.: 14/084,020

(22) Filed: Nov. 19, 2013

(65) Prior Publication Data
US 2015/0143241 A1 May 21, 2015

(51) Int. Cl.
G06F 3/048 (2013.01)
G06F 3/16 (2006.01)
G06F 17/30 (2006.01)

(52) U.S. Cl.
CPC ........ G06F 3/167 (2013.01); G06F 17/30899 (2013.01)

(58) Field of Classification Search
CPC ............................ G06F 3/167; G06F 17/30899
See application file for complete search history.

(56) References Cited

U.S. PATENT DOCUMENTS

| | | | | |
|---|---|---|---|---|
| 6,157,705 A | * | 12/2000 | Perrone | H04M 3/4938 379/88.01 |
| 6,594,348 B1 | * | 7/2003 | Bjurstrom | G06F 17/30899 379/88.13 |
| 6,604,075 B1 | | 8/2003 | Brown et al. | |
| 6,721,705 B2 | * | 4/2004 | Kurganov | H04M 3/4938 704/270 |
| 7,246,063 B2 | | 7/2007 | James et al. | |
| 7,624,101 B2 | * | 11/2009 | Lin | G06F 17/3087 |
| 7,720,707 B1 | * | 5/2010 | Mowry | G06Q 30/02 705/14.1 |
| 8,046,220 B2 | | 10/2011 | Agarwal et al. | |
| 8,983,839 B2 | * | 3/2015 | Kennewick | G06Q 30/0261 704/254 |
| 2002/0054090 A1 | * | 5/2002 | Silva | G06F 17/30905 715/747 |

(Continued)

OTHER PUBLICATIONS

Suchato, et al., "Enhancing a Voice-Enabled Web Browser for the Visually Impaired", In Proceedings of the International Conference on Applied Science, Sep. 3, 2006, 7 pages.

(Continued)

Primary Examiner — William L Bashore
Assistant Examiner — Gregory A Distefano
(74) Attorney, Agent, or Firm — Arent Fox LLP (57) ABSTRACT

A system and method are disclosed for navigation on the World Wide Web using voice commands. The name of a website may be called out by users several different ways. A user may speak the entire URL, a portion of the URL, or a name of the website which may bear little resemblance to the URL. The present technology uses rules and heuristics embodied in various software engines to determine the best candidate website based on the received voice command, and then navigates to that website.

20 Claims, 9 Drawing Sheets

(56) References Cited

U.S. PATENT DOCUMENTS

| | | | | |
|---|---|---|---|---|
| 2004/0006474 | A1* | 1/2004 | Gong | H04M 3/4931 704/270.1 |
| 2004/0034532 | A1* | 2/2004 | Mukhopadhyay | H04M 3/4936 704/270.1 |
| 2005/0132277 | A1* | 6/2005 | Griswold | G06F 17/30876 715/201 |
| 2006/0010386 | A1* | 1/2006 | Khan | G06F 17/30905 715/728 |
| 2008/0208586 | A1* | 8/2008 | Ativanichayaphong | 704/270.1 |
| 2008/0208590 | A1* | 8/2008 | Cross | G10L 15/22 704/275 |
| 2008/0255851 | A1* | 10/2008 | Ativanichayaphong | G10L 15/265 704/275 |
| 2009/0132494 | A1* | 5/2009 | Gutlapalli | G06F 17/30011 |
| 2009/0254425 | A1* | 10/2009 | Horowitz | G06F 17/30864 705/300 |
| 2012/0059810 | A1* | 3/2012 | Sejnoha | G06F 17/30976 707/706 |
| 2014/0350941 | A1* | 11/2014 | Zeigler | G10L 21/10 704/275 |

OTHER PUBLICATIONS

Gu, et al., "Spoken Query for Web Search and Navigation", In Proceedings of the Tenth International World Wide Web Conference, May 1, 2001, 2 pages.

\* cited by examiner

*Fig. 5*
*(Step 214)*

*Fig. 6*

Fig. 7
(Step 214)

Fig. 8

Fig. 9
(Step 214)

WEBSITE NAVIGATION VIA A VOICE USER INTERFACE

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a natural user interface ("NUI"). With NUI, user gestures and speech are detected, interpreted and used to control game characters or other aspects of an application.

Web surfing and Internet connectivity have also been integrated into many computer games and multimedia applications. A common task that users do within a web browser is to navigate to URLs. Generally, this is done by clicking a hypertext link within a page. However, sometimes users instead want or need to manually enter a URL. With a traditional user interface (mouse, keyboard, touch), this is done by typing a website address (URL) into the address bar, or by selecting a bookmark. In a NUI system, these metaphors are inapplicable or cumbersome.

SUMMARY

The present technology, roughly described, relates to a system and method for navigation on the World Wide Web using voice commands. In one embodiment, the voice commands are received by a NUI system to indicate a desire to browse to a website, together with an indication of the name of the website. The name of a website may be called out by users several different ways. A user may speak the entire URL, a portion of the URL, or a name of the website which may bear little resemblance to the URL. The present technology uses rules and heuristics embodied in various software engines to determine the best candidate website based on the received voice command, and then navigates to that website.

In one example, the present technology relates to a method of navigating to a website via a voice command, comprising: (a) receiving a command to navigate to a website; (b) receiving an expression following the command received in said step (a); (c) comparing the expression received in said step (b) against a closed set grammar, the closed set grammar including variants on ways in which each website in a predefined group of top websites is spoken; (d) identifying a match between the expression received in said step (b) and a variant of the closed set grammar; and (e) identifying a website associated with variant identified as a match in said step (d).

In a further example, the present technology relates to a computer-readable storage medium for programming a processor to perform a method of navigating to a website via a voice command, comprising: (a) receiving a command to navigate to a website; (b) receiving an expression following the command received in said step (a); and (c) identifying from a search engine query log a website in a group of search results for a query matching the expression received in said step (b).

In a further example, the present technology relates to a system for navigating to a website via a voice command, the system comprising: a user interface including a microphone for accepting a spoken expression; a one-to-one lookup engine for identifying a match between the spoken expression and a website contained in a stored list of websites; a top URLs engine for comparing the spoken expression against a closed set grammar to identify a match, the closed set grammar including variants on ways in which each website in a predefined group of top websites is spoken; and a general URL retrieval engine for identifying from a search engine query log a website in a group of search results for a query matching the spoken expression.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Embodiments of the present technology will now be described with reference to FIGS. 1-10B, which in general relate to a system including a speech recognition engine for receiving a voice command to navigate to a website, and software engines for interpreting the received command and determining the best candidate website therefrom. In an embodiment, the system may use one or more of three software engines. A first software engine may embody a lookup table having a one-to-one mapping of spoken phrases to websites. A second software engine may use a closed set grammar of spoken phrases developed with regard to a closed set of the top (most commonly accessed) websites.

This engine maps various ways websites in this closed set may be spoken to specific websites. A third software engine uses a generalized grammar, for example consisting of all English language text. This engine works in combination with a search engine log to return the top result for a spoken phrase. These engines can be used in a serial hierarchy or in parallel with each other to determine the best candidate website for a spoken phrase.

Figure 1:
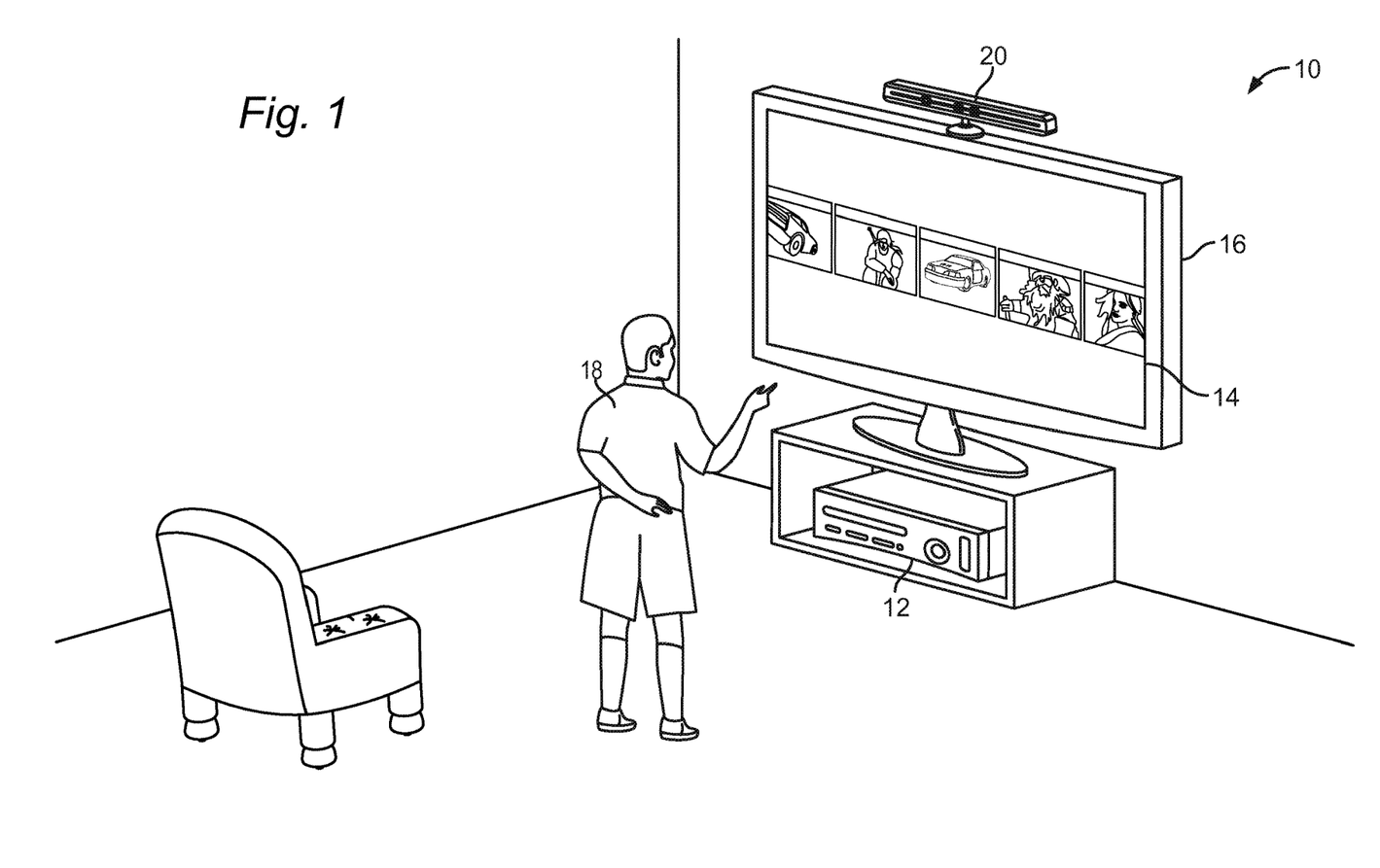
FIG. 1 illustrates an example embodiment of a target recognition, analysis, and tracking system.
Figure 2:
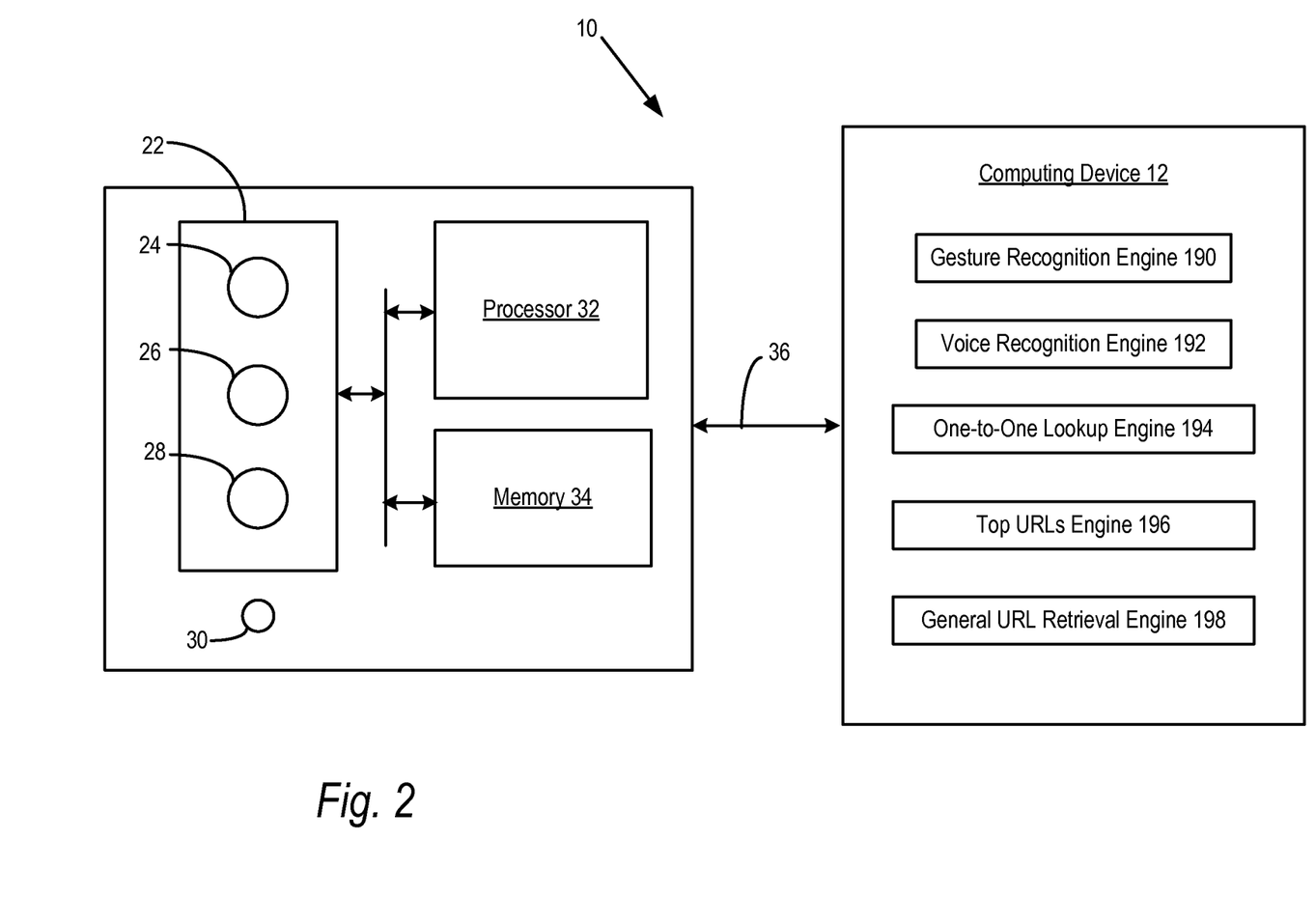
FIG. 2 illustrates an example embodiment of a capture device that may be used in a target recognition, analysis, and tracking system.
Figure 3:
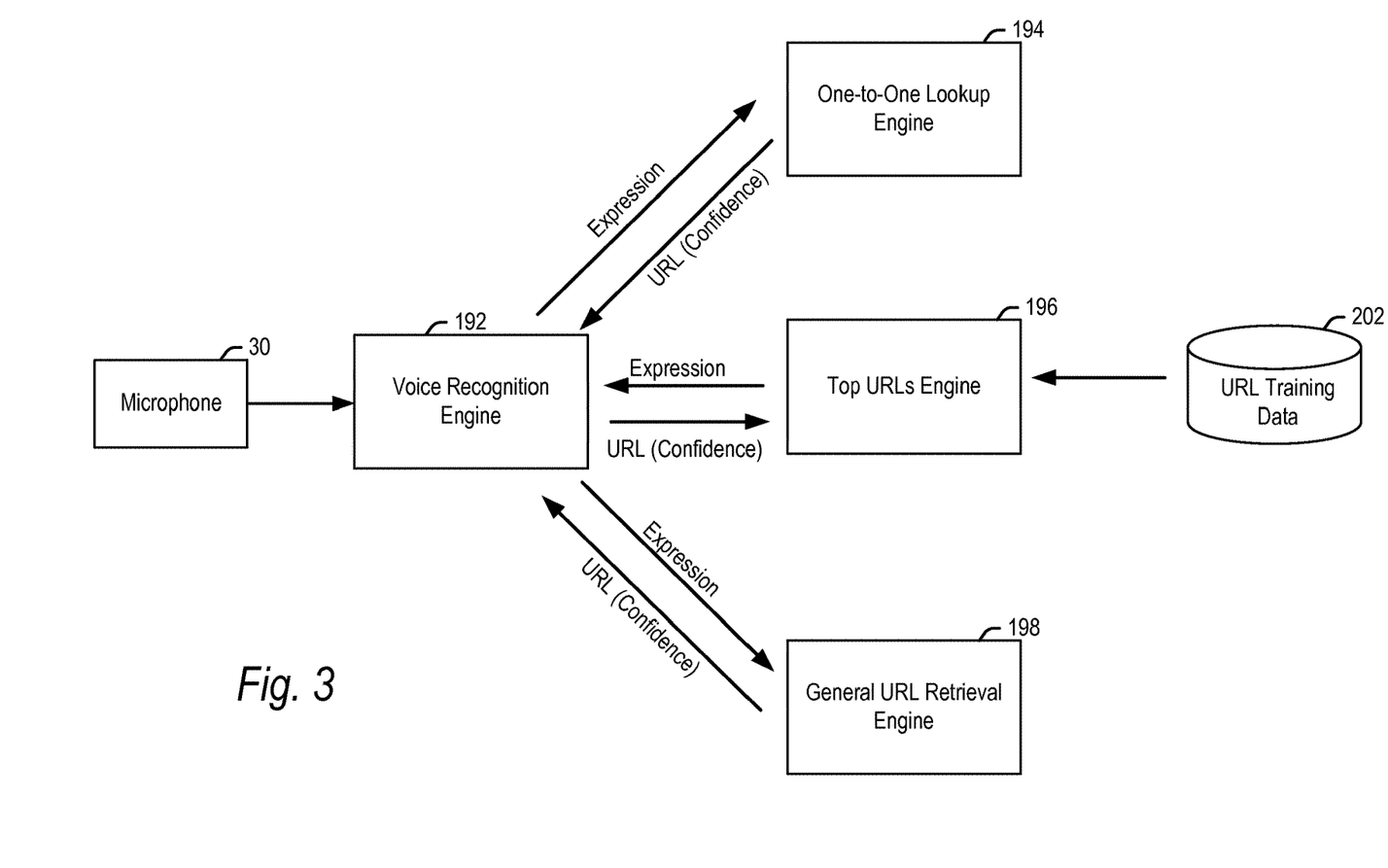
FIG. 3 is a block diagram illustrating the operation of various software engines to identify a website matching a spoken expression.

Referring initially to FIGS. 1-3, the hardware for implementing the present technology may include a target recognition, analysis, and tracking system 10 which may be used to recognize, analyze, and/or track a human target such as the user 18. Embodiments of the target recognition, analysis, and tracking system 10 include a computing environment 12 for executing a gaming or other application. The computing environment 12 may include hardware components and/or software components such that computing environment 12 may be used to execute applications such as gaming and non-gaming applications. In one embodiment, computing environment 12 may include a processor such as a standardized processor, a specialized processor, a microprocessor, or the like that may execute instructions stored on a processor readable storage device for performing processes described herein.

The system 10 further includes a capture device 20 for capturing image and audio data relating to one or more users and/or objects sensed by the capture device. In embodiments, the capture device 20 may be used to capture information relating to movements, gestures and speech of one or more users, which information is received by the computing environment and used to render an on-screen avatar, as well as to interact with and/or control aspects of a gaming or other application. Examples of the computing environment 12 and capture device 20 are explained in greater detail below.

Embodiments of the target recognition, analysis and tracking system 10 may be connected to an audio/visual device 16 having a display 14. The device 16 may for example be a television, a monitor, a high-definition television (HDTV), or the like that may provide game or application visuals and/or audio to a user. For example, the computing environment 12 may include a video adapter such as a graphics card and/or an audio adapter such as a sound card that may provide audio/visual signals associated with the game or other application. The audio/visual device 16 may receive the audio/visual signals from the computing environment 12 and may then output the game or application visuals and/or audio associated with the audio/visual signals to the user 18. According to one embodiment, the audio/visual device 16 may be connected to the computing environment 12 via, for example, an S-Video cable, a coaxial cable, an HDMI cable, a DVI cable, a VGA cable, a component video cable, or the like.

In embodiments, the computing environment 12, the AN device 16 and the capture device 20 may cooperate to interpret user 18 movements and/or verbal commands as application controls and operating system controls that are outside the realm of games or the specific application running on computing environment 12. As one example shown in FIG. 1, a user may scroll through and control interaction with a variety of menu options presented on the display 14. Virtually any controllable aspect of an operating system and/or application may be controlled by movements and/or voice of the user 18. The system 10 may additionally be used to render an avatar or on-screen character on display 14. In embodiments, the avatar mimics the movements of the user 18 in real world space so that the user 18 may perform movements and gestures which control the movements and actions of the avatar on the display 14.

Suitable examples of a system 10 and components thereof are found in the following co-pending patent applications: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; and U.S. patent application Ser. No. 12/391,150, entitled "Standard Gestures," filed Feb. 23, 2009.

FIG. 2 illustrates an example embodiment of the capture device 20 that may be used in the target recognition, analysis, and tracking system 10. In an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a 3-D depth camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles, to obtain visual stereo data that may be resolved to generate depth information. In another example embodiment, the capture device 20 may use point cloud data and target digitization techniques to detect features of the user.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio commands such as phrases spoken by the user to control applications such as game applications, non-game applications, or the like that may be executed by the computing environment 12. As explained below, the audio commands may be used to navigate to websites on the World Wide Web.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may perform a variety of actions. The computing environment may further determine which controls to perform in an application executing on the computer environment based on, for example, gestures of the user that have been recognized from the skeletal model. For example, as shown in FIG. 2, the computing environment 12 may include a gesture recognition engine 190 for determining when the user has performed a predefined gesture. Various embodiments of the gesture recognition engine 190 are described in the above mentioned applications. The computing environment 12 may further include a speech recognition engine 192 for recognizing speech or audio commands, and software engines 194, 196 and 198 for recognizing spoken commands to navigate to a particular website as explained hereinafter. Portions, or all, of the gesture recognition engine 190, speech recognition engine 192 and/or engines 194, 196, 198 may be resident on capture device 20 and executed by the processor 33 in further embodiments. Further, portions, or all, of the gesture recognition engine 190, speech recognition engine 192 and/or engines 194, 196, 198 may be resident on a central service 446 in further embodiments as explained hereinafter.

Figure 4:
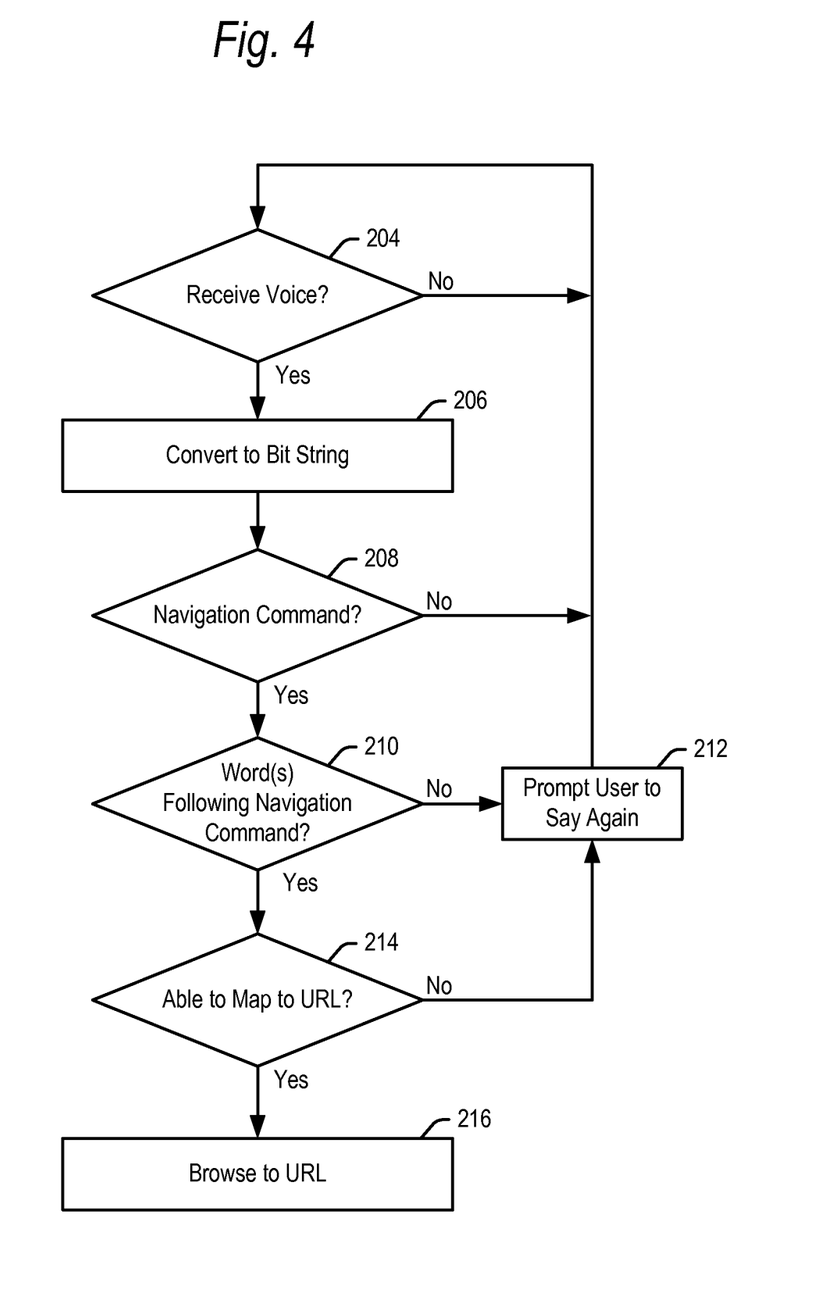
FIG. 4 is a flowchart illustrating the operation of the present technology to identify a website matching a spoken expression.

Operation of the present technology will now be described with reference to the block diagram of FIG. 3 and the flowcharts of FIGS. 4-9. Referring to FIG. 4, in step 204, the speech recognition engine 192 determines whether voice is detected from microphone 30, and if so, it is converted into a bit string in step 206. In step 208, the system determines whether the bit string correlates to a stored, predefined navigation command to navigate to a URL. For example, the system may look for the words "Navigate To . . . ," or "Go To . . . " Other words may be used for the navigation command in addition to or instead of that phrase in further embodiments. If the navigation command is not detected, the system may return to step 204 to look for further spoken words and commands.

If the bit string correlates to the predefined navigation command in step 208, the system may then look for spoken sounds in step 210 that follow the navigation command. For example, if the system determines the user has said the predetermined navigation command, the system then looks for the spoken sounds, including for example word(s), phrase(s) and/or letter(s) immediately following the navigation command. These spoken sounds following the navigation command are referred to herein as expressions If no such expression is detected after the navigation command in step 210, the system may prompt the user to speak the navigation command and expression again in step 212.

If an expression following the navigation command is detected in step 210, the system attempts to resolve the expression into a known URL in step 214. Further details of step 214 are described below with respect to the flowcharts of FIGS. 5-9. If the system is not able to map the received expression to a URL (or cannot map to a URL with a predefined confidence level as explained below), the system may prompt the user to speak again in step 212. If step 212 is reached (from step 210 and/or 214) a predetermined number of times, for example three, the system may not keep prompting the user to speak again, but may instead provide a visual or audible message that it was unable to complete the command If the system was able to resolve the expression into a URL, the system may browse to that URL in step 216 and present it to the user via display 14.

There are a number of different algorithms, embodied in software engines, that can be used to resolve or map expressions into URLs in step 214. These software engines may include engines which are referred to herein as one-to-one lookup engine 194, top URLs engine 196 and general URL retrieval engine 198. These engines may be used individually as alternatives to each other to determine a URL from an expression, or in combination in a variety of hierarchies to determine a URL from expressions.

Figure 5:
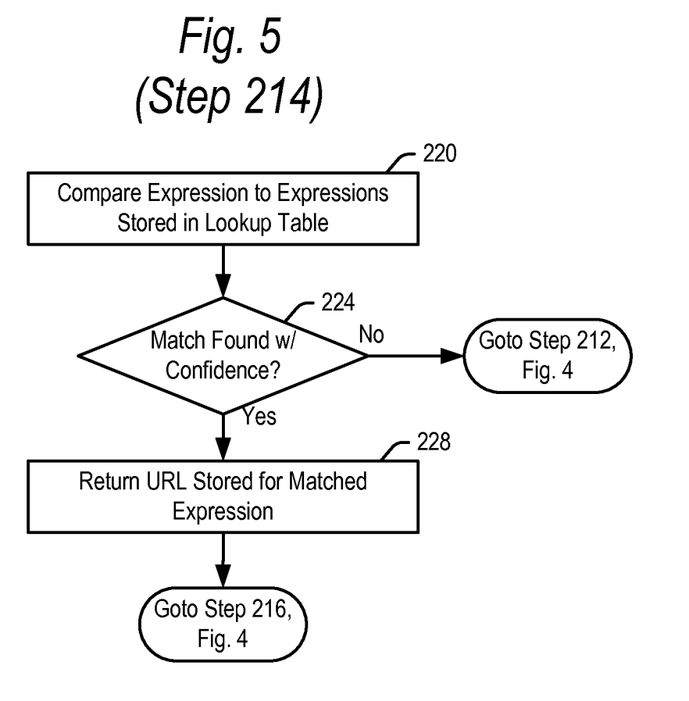
FIG. 5 is a flowchart illustrating the operation of a first software engine to identify a website matching a spoken expression.

Referring now to the flowchart of FIG. 5, the one-to-one lookup engine 194 may be used to map a spoken expression to a URL. In step 220, the one-to-one lookup engine 194 may take the spoken expression, which has been resolved into a bit string, and compare it to binary representations of expressions stored in a lookup table in memory. This memory may be local to computer environment 12, or remote, for example as part of a central service 446 explained below with reference to FIG. 10B.

Figure 6:
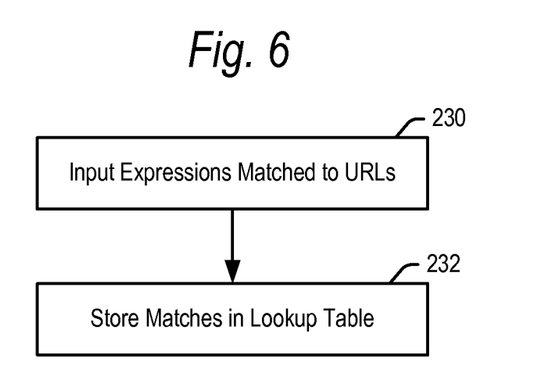
FIG. 6 is a flowchart illustrating the steps in preparing a lookup table for use by the first software engine.

As shown in the flowchart of FIG. 6, the lookup table may be set up to store binary representations of expressions matched to specific URLs. The expressions and the URLs they match to may be input in step 230 and stored in memory in step 232.

In step 224, the one-to-one lookup engine 194 determines whether a spoken expression matches a stored expression to within some predefined confidence level. That is, the one-to-one lookup engine 194 may include a fuzzy logic routine that determines whether there is a single good match, multiple good matches, or no good matches. In the case there is a single good match, the confidence level may be high (and above the predetermined confidence level). If there is no good matches, the confidence level may be low (and below the predetermined confidence level). If there are multiple good matches, the fuzzy logic routine may apply various heuristics to establish if one of the matches is more clearly the best match to satisfy the predetermined confidence level. If so, that is considered the match with confidence. If not, it may be considered the best match, but not with sufficient confidence.

If a match to the spoken expression is not found in step 224 with sufficient confidence, the flow returns to step 212 (FIG. 4), and the user is prompted to speak the expression again. On the other hand, if a match to the spoken expression is found in step 224 with sufficient confidence, the one-to-one lookup engine 194 returns the URL stored in association with the matched expression in step 228. The flow then returns to step 216 (FIG. 4), where the identified URL is shown to the user.

This sequence of FIGS. 4 and 5 is shown schematically in the top portion of FIG. 3. The speech recognition engine 192 receives a navigation command and spoken expression from the microphone 30, passes the binary representation of the expression to the one-to-one lookup engine 194, which returns a URL. For embodiments explained hereinafter, the one-to-one lookup engine 194 may return both a URL and a confidence, as established by the fuzzy logic routine of the one-to-one lookup engine 194.

The top URLs engine 196 may additionally or alternatively be used to map a spoken expression to a URL in step 214 of FIG. 4. In general, this embodiment forms a list of the top, i.e., most often accessed, websites. This may be the websites that are accessed, for example, 90% of the time (this percentage may vary in further embodiments). This embodiment takes those top websites and then constructs a grammar that supports those sites. The grammar may consist of the different ways that each website in the list may be spoken. For example, a user seeking the URL: www.nytimes.com may speak the name of that website any of a variety of different ways, including for example:
  "h t t p colon back slash back slash w w w dot new york times dot com"
  "h t t p colon slash slash w w w dot n y times dot com"
  "w w w dot new york times dot com"
  "w w w dot n y times dot com"
  "new york times dot com"
  "new york times"
  "the new york times"
  "n y times"

Further combinations of these and other possibilities can also be said in order to access this URL. Many or even all websites in the group of top websites may be spoken a variety of different ways.

Further details of the top URLs engine 196 will now be explained with reference to FIGS. 7 and 8. In step 236, the top URLs engine 196 may take the spoken expression, which has been resolved into a bit string, and compare it to binary representations of expressions stored in a closed-set grammar for a predefined set of the top, most commonly accessed websites. This grammar, which is in effect a dictionary of defined sounds, words and phrases, may be stored in a memory that is local to computer environment 12, or remote, for example as part of a central service 446 explained below with reference to FIG. 10B.

Figure 8:
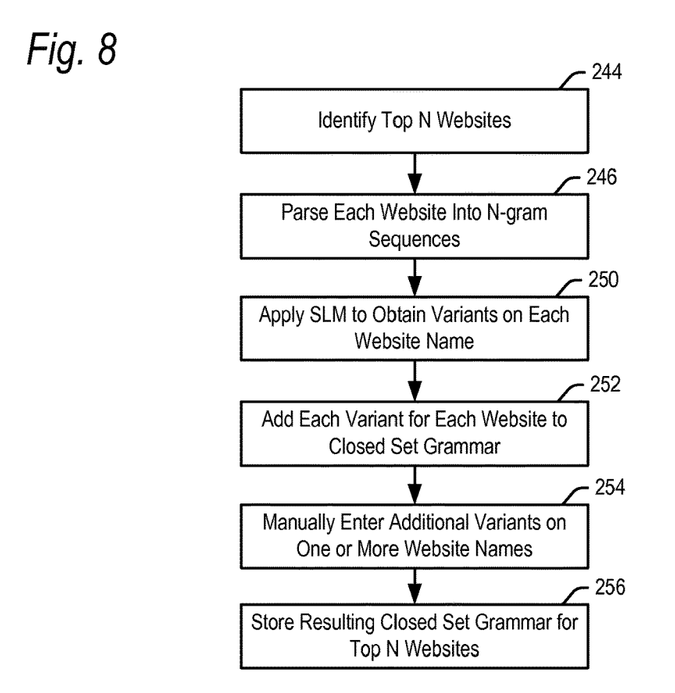
FIG. 8 is a flowchart illustrating the steps in building a closed set grammar for use by the second software engine.

FIG. 8 describes an embodiment for developing the closed-set grammar used by the top URLs engine 196. In step 244, a set of top N websites are identified. This may be identified any of several ways, including for example review of search engine logs, or browsing data collected from the central service 446 (FIG. 10B). What may be considered the top websites may vary in embodiments and it is not imperative that it in fact match what browsing data or search engine logs show to be the top websites. Additionally, the top websites may vary in different geographic locations. Demographics may also be considered in identifying the top websites. For example, there may be multiple sets of top websites, one each for different age groups. There may be different sets of top websites, one each for different genders, etc. When a user logs into the system 10, the appropriate set of top websites may be selected based on the user demographic.

Steps 246, 250, 252 and 254 describe one example for breaking down each of the websites into all different combinations that users are likely to use in speaking the name of that website. In step 246, each website in the group of top websites may be parsed into N-gram sequences, to define a number of contiguous sequences of n items for each website from a given sequence of text or speech. The items can be phonemes, syllables, letters, words or phrases. The formation of the N-gram sequences may be performed by an algorithm and/or by one or more human administrators.

In step 250, a linguistics model, such as statistical language modeling may be applied to the N-gram sequences for each website in the group of top websites to obtain the different variants that each website may be spoken. The linguistic model used may cover all known and/or common ways that a website may be spoken, using the N-gram sequences. Again, the linguistics model may be applied by a computer and/or by one or more human administrators. The variants for each website may be added to the closed set grammar in step 252.

Whether the N-gram sequence formation and application of the linguistics model are performed by algorithm or human administrator, a human administrator may perform a separate step (step 254) of adding additional variants or manually tuned pronunciations for one or more of the website names in step 254. The additional variants in step 254 may be for known variants that are used for a website, but are arbitrary or not covered by an algorithmic rule. For example, the website may be an arbitrary, made-up word. For example, for the website "Reddit.com," may have a manually tuned entry of "red-dit."

The manually tuned variants or pronunciations may further include known abbreviations or specific vernacular. For example, the formal name of a highway may be the "Interstate 405," but may commonly be referred to as "the 405," "i 405," or just "the 5." Each of these variants may be captured in the closed set grammar in step 254, for example as "the four-oh-five," "i-four-oh-five," etc. The closed set of grammars may further include a user-defined list of websites, such as for example a list of the user's favorite websites, possibly edited and renamed by the user, to have more memorable or pronounceable names.

As a further example of manually tuned pronunciation, some websites may be referred to by their letters instead of pronouncing it as a word. For example, a user may say "c n n" for the website www.cnn.com. Instead of storing this variant as a single word "cnn," the administrator(s) may manually tune this variant as separate letters, "c," "n" and "n" to match the expression as it is actually spoken. A wide variety of other specialized variants and tuning may take place in step 254.

While steps 246, 250, 252 and 254 illustrate one embodiment for deriving all known and/or commonly spoken forms of the top websites, other methods are contemplated. For example, in one further embodiment, crowdsourcing may be used to determine, for each of the top websites in the group, the different variants of how those websites are spoken. Other methods and linguistic models are contemplated.

The closed set grammar of all known and/or commonly used variants for all websites in the group of top websites may be stored in memory in step 256. The grammar may be stored in memory local to the computing environment 12 or remotely on the central service 446 explained below.

Returning to FIG. 7, in step 238, the top URLs engine 196 determines whether a spoken expression matches a stored expression in the closed set grammar to within some predefined confidence level. As explained above, the top URLs engine 196 may include a fuzzy logic routine that determines whether there is a single good match, multiple good matches, or no good matches, and provide a confidence with the match.

If a match to the spoken expression is not found in the closed set grammar in step 238 with sufficient confidence, the flow returns to step 212 (FIG. 4), and the user is prompted to speak the expression again. On the other hand, if a match to the spoken expression is found in step 238 with sufficient confidence, the top URLs engine 196 returns the URL stored in association with the matched expression in step 240. The flow then returns to step 216 (FIG. 4), where the identified URL is shown to the user.

Figure 7:
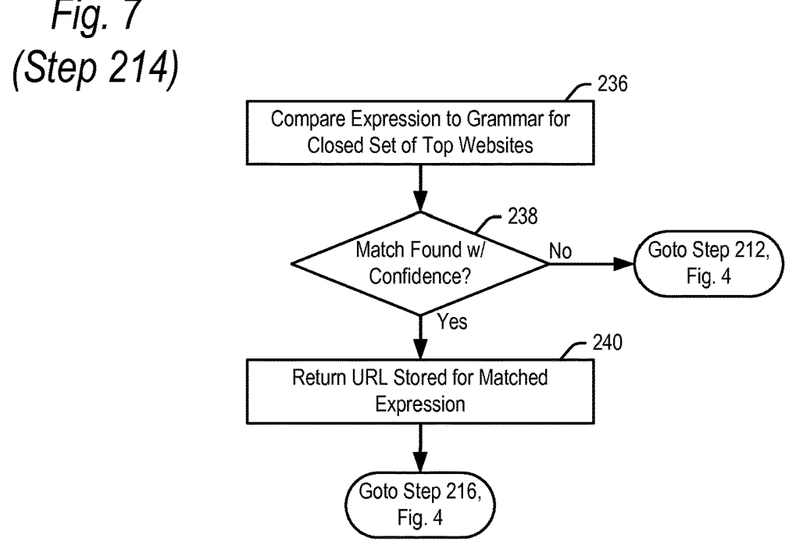
FIG. 7 is a flowchart illustrating the operation of a second software engine to identify a website matching a spoken expression.

This sequence of FIGS. 7 and 8 is shown schematically in the middle portion of FIG. 3. The speech recognition engine 192 receives a navigation command and spoken expression from the microphone 30, passes the binary representation of the expression to the top URLs engine 196, which returns a URL. As shown in FIG. 3, the grammar used by the top URLs engine 196 may be developed from URL training data 202, according to any of the methods described above with respect to steps 246, 250, 252 and 254, and alternatives thereof For embodiments explained hereinafter, the top URLs engine 196 may return both a URL and a confidence, as established by the fuzzy logic routine of the top URLs engine 196.

While the top URLs engine may be effective at identifying when users speak one of the most common websites, it may happen that a user wishes to navigate to a website that is not one of the most common websites. Accordingly, the general URL retrieval engine 198 may additionally or alternatively be used to map a spoken expression to a URL in step 214 of FIG. 4. Further details of the general URL retrieval engine 198 will now be explained with reference to FIG. 9. In step 260, the general URL retrieval engine 198 may take the spoken expression, which has been resolved into a bit string, and use it as a search query in a search engine such as the Bing® search engine. The spoken expression is used as a query to determine if search results have been stored for that query in one or more query logs of the search engine.

Figure 9:
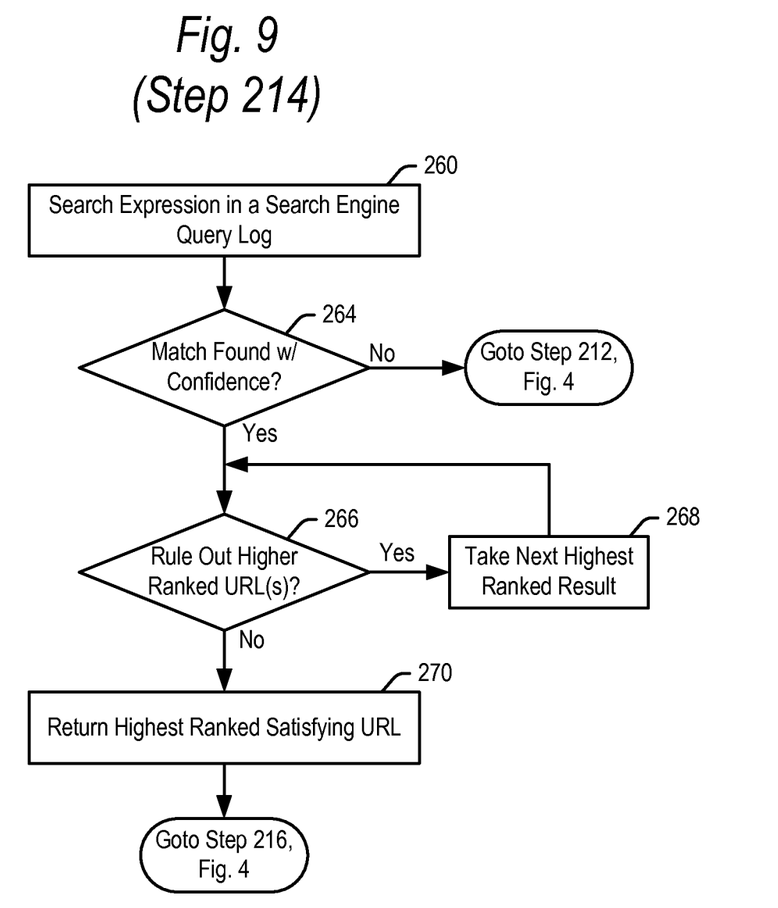
FIG. 9 is a flowchart illustrating the operation of a third software engine to identify a website matching a spoken expression.

The generation and maintenance of search engine query logs is well known and outside the scope of the present technology. However, in general, query logs have been developed so that, when a phrase such as a desired website is entered as a search query, the most relevant search results for that query may be obtained from the query log and returned, ranked in the order of most to least relevant.

In step 264, the general URL retrieval engine 198 determines whether one or more results were identified in the query log for a given spoken expression. It may be that no results for the spoken expression as a query were found in the search log, in which case the flow returns to step 212 (FIG. 4). It may also be that very few results exist for the spoken expression as a query, which can indicate a low confidence in the top result. In embodiments, where more than a predetermined number of results exist for a given spoke expression as a query, the top result may be considered to exceed a requisite confidence level. If the result is not identified with the threshold confidence, the flow returns to step 212 (FIG. 4).

If one or more websites are identified by the general URL retrieval engine 198, the general URL retrieval engine 198 may select the highest ranked website in the results. It may be other than the highest ranked website in further embodiments. For example, it may be that, using predefined heuristics, the general URL retrieval engine 198 is able to rule out the highest ranked website as a candidate for the desired URL. As one example, the top rated result may be an online encyclopedia, dictionary or other website which discusses or explains what is understood as the spoken expression, but which is not a website for the spoken expression itself. For example, the top ranked result for a spoken expression may be a Wikipedia entry. Unless the spoken expression was for Wikipedia in this example, the general URL retrieval engine 198 can rule out Wikipedia.com as the website to which the user desires to navigate. A group of encyclopedia, dictionary and other websites of this kind may be defined, and ruled out as a result in step 266 unless the spoken expression is determined to be one of these encyclopedia, dictionary, etc. websites.

If the highest ranked result is ruled out in step 266, the next highest remaining result is taken in step 268, and the check in step 266 is performed again. The highest ranking result which is not ruled out is returned in step 270. The flow then returns to step 216, FIG. 4. This sequence of FIG. 9 is shown schematically in the lower portion of FIG. 3. The speech recognition engine 192 receives a navigation command and spoken expression from the microphone 30, passes the binary representation of the expression to the general URL retrieval engine 198, which returns a URL. For embodiments explained below, the general URL retrieval engine 198 may return both a URL and a confidence, as established by the number of results identified together with the returned URL as explained above.

FIGS. 5-9 describe a few alternatives for mapping a spoken expression to a URL in step 214 of FIG. 4. It is understood that other alternatives are contemplated. Moreover, it is understood that any combination of the one-to-one lookup engine 194 (FIGS. 5-6), the top URLs engine 196 (FIGS. 7-8) and the general URL retrieval engine 198 (FIG. 9) may be used in embodiments. It may be that just one of the engines 194, 196 and 198 is used. It may be that all of the engines are used.

Where two or more of the software engines 194, 196 and 198 are used, they may be used in serially or in parallel. In embodiments where the engines are used serially, the spoken expression may be fed to a first of the software engines 194, 196, 198. If a URL is identified by that software engine above a threshold confidence level, that URL may be used. If the first software engine does not return a URL with a confidence level above a threshold, the spoken expression may be fed to a second of the software engines 194, 196, 198. If that engine identifies a URL above the threshold confidence, that URL may be used. If the first and second software engines do not return a URL with a confidence level above a threshold, the spoken expression may be fed to a third of the software engines 194, 196, 198. If that engine identifies a URL above the threshold confidence, that URL may be used. If no URL is identified with a confidence above the threshold, the flow may return to step 212 in FIG. 4, prompting the user to speak again.

In the embodiment where the software engines 194, 196, 198 are used serially, the one-to-one lookup engine 194 may be used first, the top URLs engine 196 may be used second and the general URL retrieval engine 198 may be used third. However, it is understood that the engines 194, 196 and 198 may be used serially in any order.

In embodiments where the engines are used in parallel, the spoken expression may be fed to all three software engines 194, 196, 198. Each may return an identified URL with a confidence. Where all three identify the same URL, the system may navigate to that URL in step 216. Where the different software engines 194, 196, 198 identify two or more different URLs, the system may look at the confidence level returned by the respective software engines for the URL they identified.

If two engines identified the same URL with higher confidences than the URL identified by the third engine, the system may navigate to the URL identified by the two engines. Where two engines identified the same URL, but with a lower confidence than the URL identified by the third engine, or all three identify different URLs, the system may have rules for determining to which URL the system navigates. These rules may include what to do for specific relative confidences. These rules may also include that one or more of the software engines may be weighted differently than the others. Thus, for example, if the three engines identify three separate URLs, each with relatively the same confidence, the system may navigate to the URL specified by the software engine having the greatest weight. Any of the engines may be assigned the greatest weight in different embodiments.

Figure 10A:
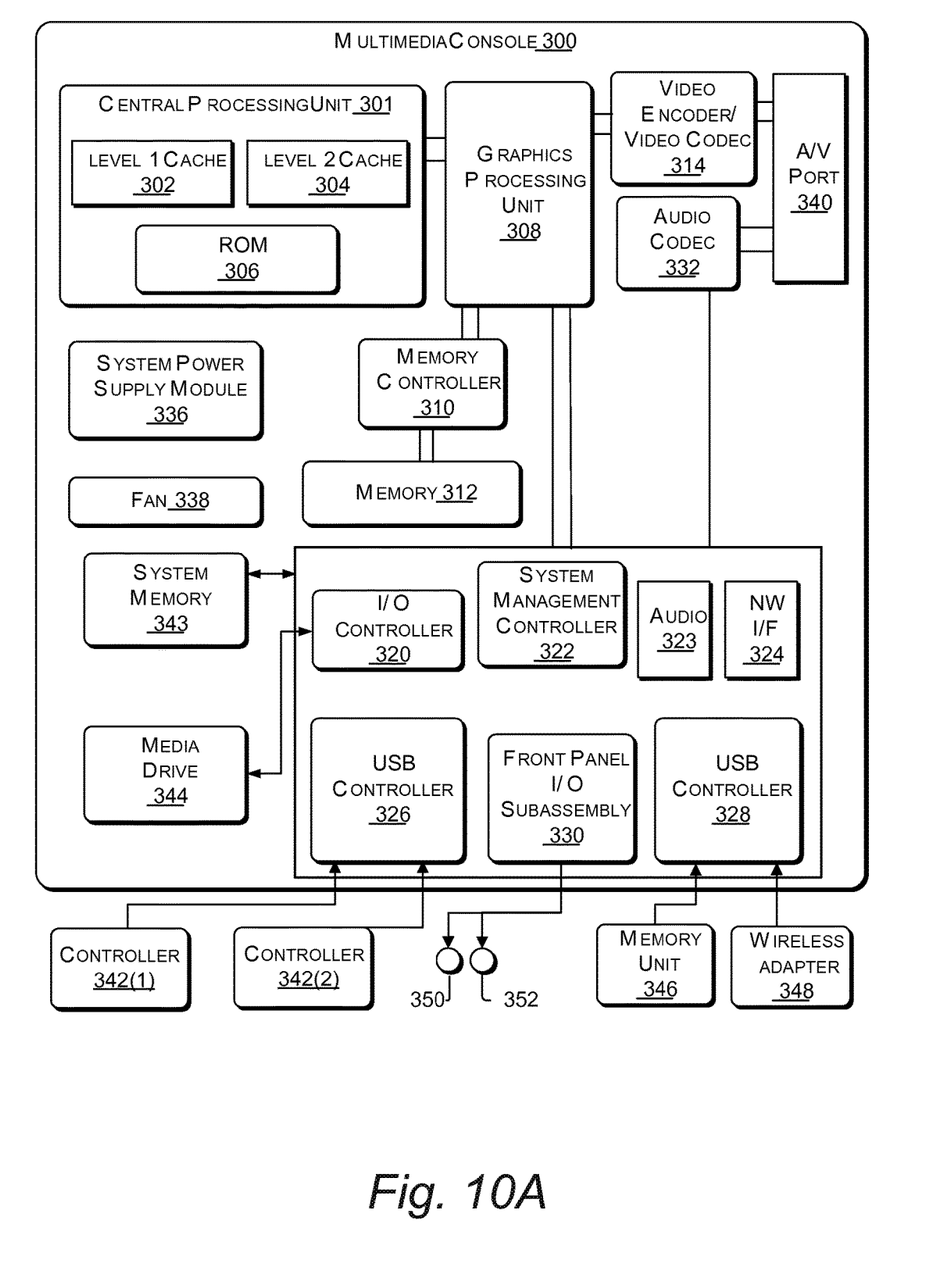
FIG. 10A illustrates an example embodiment of a computing device that may be used to interpret one or more gestures in a target recognition, analysis, and tracking system.
Figure 10B:
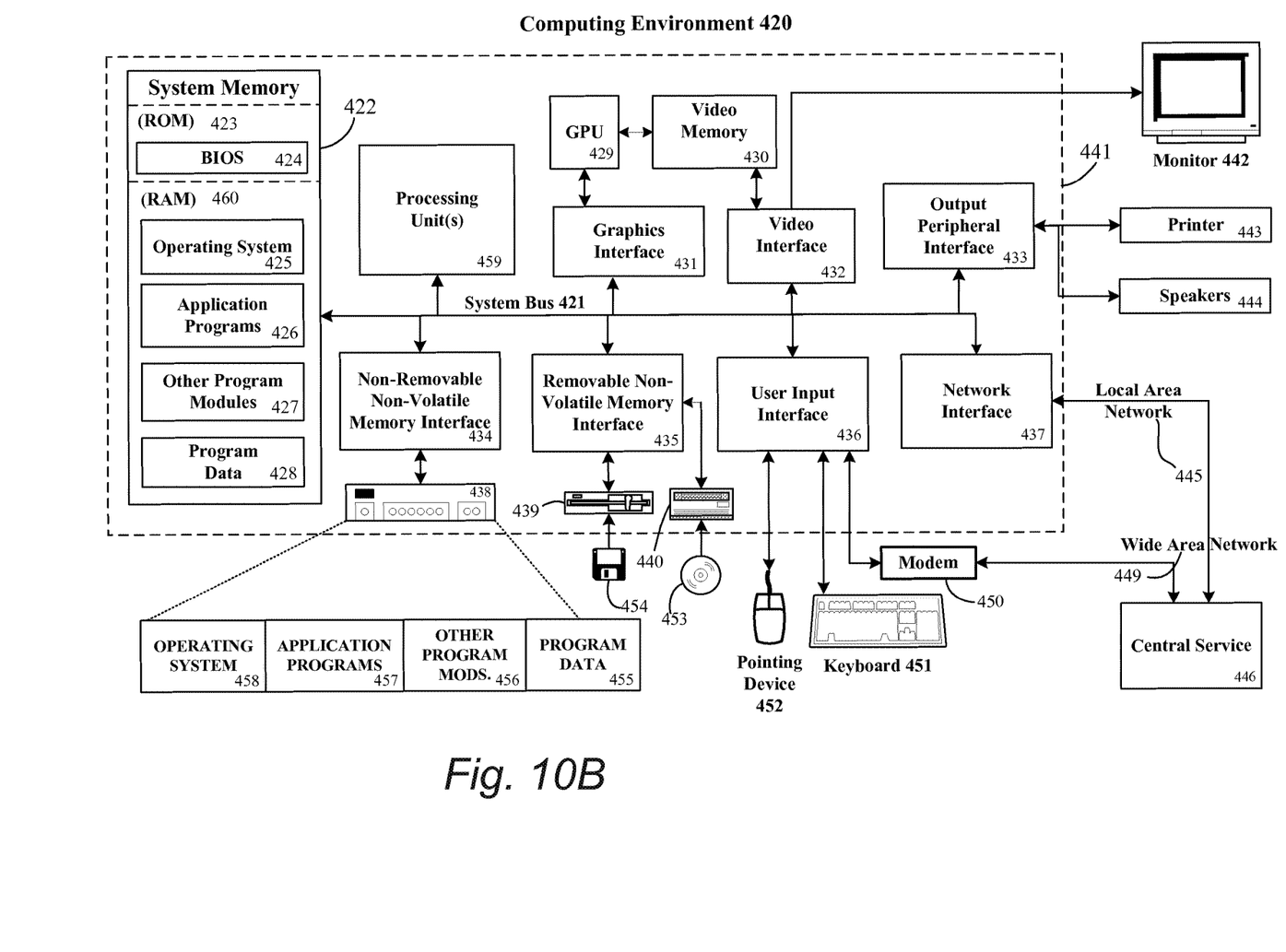
FIG. 10B illustrates another example embodiment of a computing device that may be used to interpret one or more gestures in a target recognition, analysis, and tracking system.

FIG. 10A illustrates an example embodiment of a computing environment, such as for example computing environment 12, that may be used to run the gesture recognition engine 190, the speech recognition engine 192 and the software engines 194, 196 and 198. The computing environment 12 may be a multimedia console 300, such as a gaming console. As shown in FIG. 10A, the multimedia console 300 has a central processing unit (CPU) 301 having a level 1 cache 302, a level 2 cache 304, and a flash ROM 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec (coder/decoder) 314 form a video processing pipeline for high speed and high resolution graphics processing. Data is carried from the GPU 308 to the video encoder/video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM.

The multimedia console 300 includes an I/O controller 320, a system management controller 322, an audio processing unit 323, a network interface 324, a first USB host controller 326, a second USB host controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, hard drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the console.

When a concurrent system application uses audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 300.

FIG. 10B illustrates another example embodiment of a computing environment 720 that may be the computing environment 12 shown in FIGS. 1A-2 used to interpret one or more positions and motions in a target recognition, analysis, and tracking system. The computing system environment 720 is only one example of a suitable computing environment and is not intended to suggest any limitation as to the scope of use or functionality of the presently disclosed subject matter. Neither should the computing environment 720 be interpreted as having any dependency or requirement relating to any one or combination of components illustrated in the Exemplary operating environment 720. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 10B, the computing environment 420 comprises a computer 441, which typically includes a variety of computer readable media. Computer readable media can be any available tangible media that can be accessed by computer 441 and includes both volatile and nonvolatile media, removable and non-removable media. Computer readable media does not include transitory, modulated or other transmitted data signals that are not contained in a tangible media. The system memory 422 includes computer readable media in the form of volatile and/or nonvolatile memory such as ROM 423 and RAM 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 10B illustrates operating system 425, application programs 426, other program modules 427, and program data 428. FIG. 10B further includes a graphics processor unit (GPU) 429 having an associated video memory 430 for high speed and high resolution graphics processing and storage. The GPU 429 may be connected to the system bus 421 through a graphics interface 431.

The computer 441 may also include other removable/non-removable, volatile/nonvolatile computer storage media. By way of example only, FIG. 10B illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the Exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through a non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 10B, provide storage of computer readable instructions, data structures, program modules and other data for the computer 441. In FIG. 10B, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and a pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 26, 28 and capture device 20 may define additional input devices for the console 400. A monitor 442 or other type of display device is also connected to the system bus 421 via an interface, such as a video interface 432. In addition to the monitor, computers may also include other peripheral output devices such as speakers 444 and printer 443, which may be connected through an output peripheral interface 433.

The computer 441 may operate in a networked environment using logical connections to one or more remote computers, such as a remote central service 446. The central service 446 may be a console service including a variety of servers and databases for networking a variety of consoles 300 or computing environments 12 together. It may provide content and host gaming and other applications that may be run remotely on consoles 300 or computing environments 12. One or more of the above-described software engines 194, 196, 198 may be run from the central service 446. Moreover, the lookup table used by the one-to-one lookup engine 194, the grammar used by the top URLs engine 196 and/or the query logs used by the general URL retrieval engine 198 may also be stored in memory on the central service 446. The logical connections depicted in FIG. 10B include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface or adapter 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. A method of navigating to a website via a voice command, comprising:
   receiving a command to navigate to a website;
   receiving an expression following the command, wherein the expression comprises a spoken sound of at least a portion of a universal resource locator of the website;
   comparing the expression against a closed set grammar, the closed set grammar including a plurality of spoken sound variants for each of one or more websites in a predefined group of web sites, the plurality of spoken sound variants for each of the one or more websites comprising a plurality of different length spoken portions corresponding to a full length version of each universal resource locator of each of the one or more websites and a plurality of different N-gram sequences generated from each of the plurality of different length spoken portions;
   identifying a match between the expression and a spoken sound variant of the plurality of spoken sound variants in the closed set grammar; and
   identifying a website associated with the spoken sound variant identified as the match.

2. The method of claim 1, further comprising navigating to the website associated with the spoken sound variant identified as the match.

3. The method of claim 1, the website associated with the spoken sound variant identified as the match comprising a first website, the method further comprising identifying from a search engine query log a second website from a group of search results for a query matching the expression.

4. The method of claim 3, wherein identifying the second website comprises identifying a highest ranked website for the query matching the expression.

5. The method of claim 3, further comprising navigating to the first web site where the first web site and the second website are the same.

6. The method of claim 3, further comprising determining a first confidence level that the first website is correct, and determining a second confidence level that the second web site is correct.

7. The method of claim 6, further comprising navigating to the first website where the first confidence level is higher than the second confidence level.

8. The method of claim 6, further comprising navigating to the second website where the second confidence level is higher than the first confidence level.

9. The method of claim 3, further comprising navigating to the first website where identifying the match between the expression and the spoken sound variant of the plurality of spoken sound variants in the closed set grammar is weighted more than identifying from the search engine query log the second website.

10. The method of claim 1, wherein the predefined websites comprise most often accessed websites that vary by geography and by user.

11. The method of claim 1, wherein the plurality of different N-gram sequences comprise different ones of a plurality of contiguous sequences of different length phonemes.

12. The method of claim 1, wherein the plurality of different length spoken portions corresponding to the full length version of each universal resource locator of each of the one or more websites and the plurality of different N-gram sequences comprise binary representations of spoken sounds of the plurality of spoken sound variants.

13. A system for navigating to a website via a voice command, comprising:
   a user interface including a microphone for receiving a spoken expression, wherein the spoken expression comprises a spoken sound of at least a portion of a universal resource locator of a website;
   a one-to-one lookup engine for identifying a first match between the spoken expression and a first website contained in a stored list of websites;
   a top URLs engine for identifying a second match corresponding to a second website by comparing the spoken expression against a closed set grammar including a plurality of spoken sound variants for each of one or more websites in a predefined group of websites, the closed set grammar developed by parsing the plurality of spoken sound variants as to how a URL is spoken, and the closed set grammar including the plurality of spoken sound variants on ways in which each web site in a predefined group of top web sites is spoken, the plurality of spoken sound variants for each of the one or more websites comprising a plurality of different length spoken portions corresponding to a full length version of each universal resource locator of each of the one or more web sites and a plurality of different N-gram sequences generated from each of the plurality of different length spoken portions;
   a general URL retrieval engine for identifying a third match corresponding to a third website in a group of search results for a query in a search engine query log matching the spoken expression;
   wherein each of the one-to-one lookup engine, the top URLs engine, and the general URL retrieval engine return a confidence value; and
   a processor configured to determine a matching website from the first match, the second match, or the third match based on which of the one-to-one lookup engine, the top URLs engine, or the general URL retrieval engine returns a highest confidence value.

14. The system of claim 13, wherein one or more of the one-to-one lookup engine, the top URLs engine, or the general URL retrieval engine is used serially to identify the matching website.

15. The system of claim 13, wherein each of the one-to-one lookup engine, the top URLs engine, and the general URL retrieval engine are used in parallel to identify the matching website matching the spoken expression.

16. A method of navigating to a website via a voice command, comprising:
   receiving a command to navigate to a website;
   receiving an expression following the command, wherein the expression comprises a spoken sound of at least a portion of a universal resource locator of the website;
   comparing the expression against a closed set grammar, the closed set grammar including a plurality of spoken sound variants for each of one or more web sites in a predefined group of web sites, the plurality of spoken sound variants for each of the one or more web sites comprising a plurality of different ways of speaking a name corresponding to a full length version of each universal resource locator of each of the one or more websites and a plurality of different N-gram sequences generated from the plurality of different ways of speaking the name, each such way of speaking the name of a website comprising speaking at least a portion of the website name;
   identifying a match between the expression and a spoken sound variant of the plurality of spoken sound variants in the closed set grammar; and
   identifying a website associated with the spoken sound variant identified as the match.

17. The method of claim 16, further comprising navigating to the website associated with the spoken sound variant identified as the match.

18. The method of claim 16, the website associated with the spoken sound variant identified as the match comprising a first website, the method further comprising identifying from a search engine query log a second website from a group of search results for a query matching the expression.

19. The method of claim 18, further comprising determining a first confidence level that the first website is correct; and determining a second confidence level that the second website is correct, wherein identifying the match comprises selecting one of the first website or the second website based on whether the first confidence level is greater than and the second confidence level.

20. The method of claim 16, wherein top websites for which the closed set grammar is developed varies by geography and by user.

* * * * *